(12) United States Patent
Chu et al.

(10) Patent No.: US 9,329,789 B1
(45) Date of Patent: May 3, 2016

(54) METHODS AND APPARATUS FOR EFFICIENTLY OPERATING ON A STORAGE DEVICE

(71) Applicant: Marvell International Ltd., Hamilton (BM)

(72) Inventors: Ying Chu, Shanghai (CN); Michael Wang, Shanghai (CN)

(73) Assignee: Marvell International Ltd., Hamilton (BM)

( * ) Notice: Subject to any disclaimer, the term of this patent is extended or adjusted under 35 U.S.C. 154(b) by 43 days.

(21) Appl. No.: 14/510,205

(22) Filed: Oct. 9, 2014

Related U.S. Application Data

(60) Provisional application No. 61/890,569, filed on Oct. 14, 2013.

(51) Int. Cl.
*G06F 12/00* (2006.01)
*G06F 3/06* (2006.01)

(52) U.S. Cl.
CPC .............. *G06F 3/0619* (2013.01); *G06F 3/064* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 2004/0193801 | A1* | 9/2004 | Benhase | G06F 12/0802 711/118 |
| 2005/0223174 | A1* | 10/2005 | Mogi | G06F 12/0866 711/129 |
| 2007/0067574 | A1* | 3/2007 | Stempel | G06F 12/126 711/129 |

* cited by examiner

*Primary Examiner* — Kevin Verbrugge

(57) ABSTRACT

Systems and methods for efficiently operating on a storage device are provided. In some embodiments, systems and methods for operating on a storage device having a data portion and a log portion with a plurality of regions are provided. A write command is received with a storage device controller. The write command may include an address portion and a data portion. A current position in the log is identified that corresponds to a first of the plurality of regions to which data has been written last. Data stored in a second of the plurality of regions is selectively transferred to the data portion of the storage device based on validity and frequency of use of the data. The data and address portions included in the write command are stored to the log portion based on the current position.

20 Claims, 3 Drawing Sheets

Log

| Address (210) | Log Region ID (220) | Write Count (230) | Chance Count (240) | Valid Info (250) | Data (260) |
|---|---|---|---|---|---|
| 1 | A | 0 | 0 | 0 | 1234 |
| 3 | A | 3 | 0 | 1 | 1123 |
| 7 | A | 0 | 1 | 1 | 4579 |
| 1 | B | 1 | 1 | 1 | 2222 |
| 5 | B | 2 | 1 | 0 | 3333 |
| 9 | B | 2 | 1 | 0 | |
| ⋮ | ⋮ | ⋮ | ⋮ | ⋮ | ⋮ |

Current Position → 270

142

142

Log

| Address 210 | Log Region ID 220 | Write Count 230 | Chance Count 240 | Valid Info 250 | Data 260 |
|---|---|---|---|---|---|
| 1 | A | 0 | 0 | 0 | 1234 |
| 3 | A | 3 | 0 | 1 | 1123 |
| 7 | A | 0 | 1 | 1 | 4579 |
| 1 | B | 1 | 1 | 1 | 2222 |
| 5 | B | 2 | 1 | 0 | 3333 |
| 9 | B | 2 | 1 | 0 | |
| ... | ... | ... | ... | ... | ... |

Current Position 270 →

FIG. 2

METHODS AND APPARATUS FOR EFFICIENTLY OPERATING ON A STORAGE DEVICE

CROSS REFERENCE TO RELATED APPLICATION

This disclosure claims the benefit of U.S. Provisional Application No. 61/890,569, filed Oct. 14, 2013, which is incorporated herein by reference in its entirety.

FIELD OF USE

The present disclosure relates generally to storage device systems and methods, and more particularly, to efficiently performing operations on a storage device.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, is neither expressly nor impliedly admitted as prior art against the present disclosure.

Typical solid state storage devices (e.g., NAND flash storage devices) operate by erasing previously stored information before writing new information. This is known as "garbage collection". Due to this type of operation, storing data to a same range of storage locations results in inefficiencies such as latencies. As such, these typical devices inefficiently handle writes to a same range of locations in the solid state storage devices.

SUMMARY

Systems and methods for efficiently operating on a storage device are provided. In some embodiments, systems and methods for operating on a storage device having a data portion and a log portion with a plurality of regions are provided. A write command is received with a storage device controller. The write command may include an address portion and a data portion. A current position in the log is identified that corresponds to a first of the plurality of regions to which data has been written last. Data stored in a second of the plurality of regions is selectively transferred to the data portion of the storage device based on validity and frequency of use of the data. The data and address portions included in the write command are stored to the log portion based on the current position.

In some embodiments, a determination is made as to whether the first of the plurality of regions corresponding to the current position has enough free space for storing the data and address associated with the write operation. In response to determining that the first of the plurality of regions does not have enough free space the current position is advanced to correspond to the second one of the plurality of regions adjacent to the first of the plurality of regions and the data and address associated with the write command are stored to the second of the plurality of regions. In some embodiments, the data stored in the second of the plurality of regions is selectively transferred before the data and address associated with the write command are stored to the second of the plurality of regions.

In some embodiments, a determination is made as to whether the address included in the write command matches other addresses stored in the log portion before storing the data and address portions to the log. In some embodiments, data is invalidated that is stored in the plurality of regions in the log associated with other addresses stored in the log portion that are determined to match the address included in the write command. A write count associated with the write command is computed based on a number of other addresses stored in the log portion that match the address of the write operation. The write count is stored to the log portion based on the current position as the frequency of use of the data.

In some embodiments, data stored in the second of the plurality of regions that has not been invalidated is identified. A write count associated with the identified data is compared to a threshold. The identified data is transferred from the log portion to the data portion of the storage device based on the address associated with the data in response to determining that the write count is less than the threshold. The identified data and associated address is transferred to a third of the plurality of regions and the write count associated with the data is reset in response to determining that the write count is greater than the threshold.

In some embodiments, a read command that includes an address portion is received. A determination is made as to whether the address portion of the read command matches any address stored in one of the plurality of regions in the log portion. The data stored in the one of the plurality of regions having the address that matches the address portion in the read command is retrieved. A determination is made as to whether the data in the one of the plurality of regions having the address that matches the address portion in the read command is valid. In response to determining that the data is invalid, another one of the plurality of regions in the log portion is identified having an address that matches the address portion in the read command.

BRIEF DESCRIPTION OF THE DRAWINGS

The details of one or more implementations are set forth in the accompanying drawings and the description below. Other features and various advantages will be more apparent upon consideration of the following detailed description, taken in conjunction with the accompanying drawings in which:

FIG. 2 is a diagram of an illustrative log of a storage device system in accordance with an embodiment of the present disclosure.

DETAILED DESCRIPTION

This disclosure generally relates to efficiently storing information in a storage device. For illustrative purposes, this disclosure is described in the context of a solid state storage device (e.g., volatile storage device, non-volatile storage device, a flash storage device or a NAND-based storage device). It should be understood, however, that this disclosure is applicable to any other type of non-volatile storage device (e.g., magnetic storage device, ROM, PROM, EPROM, EEPROM, nvSRAM, FeRAM, MRAM, PRAM, CBRAM, SONOS, RRAM, NRAM, Millipede memory, or holographic storage device).

Figure 1:
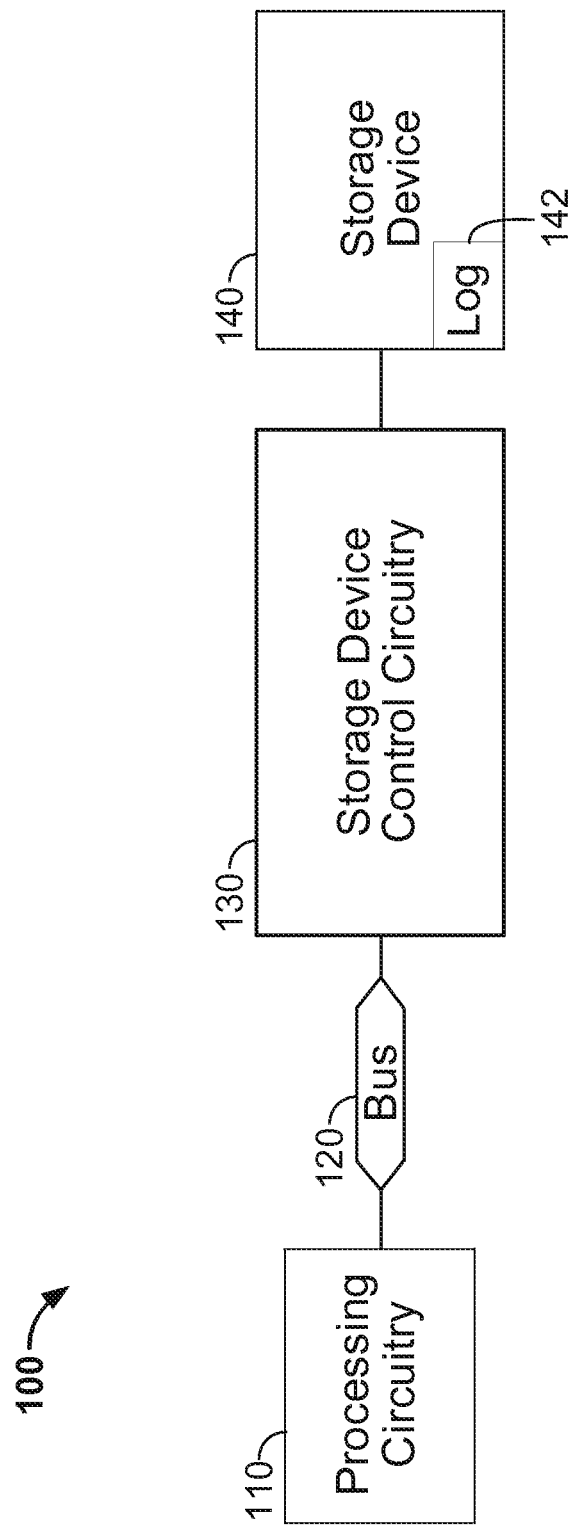
FIG. 1 is a diagram of an illustrative storage device system in accordance with an embodiment of the present disclosure.

FIG. 1 is a diagram of an illustrative storage device system 100 in accordance with an embodiment of the present disclosure. System 100 may include processing circuitry 110, a bus 120, storage device control circuitry 130 (e.g., storage device controller), a storage device 140, and a log 142. In some implementations, log 142 is a reserved section of storage device 140. For example, log 142 may correspond to a pre-determined number of storage locations of storage device 140 (e.g., 1 gigabyte), which are only visible to control circuitry 130 and not to processing circuitry 110, a user or an external application. In some implementations, log 142 is implemented by a separate volatile or non-volatile storage device (e.g., NVRAM, DRAM, SDRAM, SRAM, T-RAM, Z-RAM, TTRAM, or any combination thereof) from storage device 140. For example, log 142 may be included as part of control circuitry 130 and/or may be coupled to control circuitry 130 and to storage device 140. In some implementations, control circuitry 130 may be integrated on the same physical device as storage device 140 and/or log 142.

In some embodiments, control circuitry 130 may receive instructions (e.g., a storage device command) from another system component such as processing circuitry 110 over bus 120. For example, processing circuitry 110 may include a CPU and bus 120 may include a northbridge, front-side bus, and/or any other physical connection between processing circuitry 110 and storage device control circuitry 130. The CPU may send instructions to read/write data to storage device 140 through control circuitry 130 over bus 120. The instructions to read/write data may include a data portion, an address portion, and a read or write command.

In some embodiments, control circuitry 130 may write data received from processing circuitry 110 to storage device 140 using log 142. FIG. 2 is a diagram of an illustrative log 142 of a storage device system in accordance with an embodiment of the present disclosure. In particular, log 142 may act as a buffer for storing data to storage device 140. Data that is written to a particular storage location of storage device 140 to which data has been written more than a threshold number of times may be kept in log 142 for a longer period of time than data that is written to a storage location to which data has been written less than a threshold number. In some implementations, a storage device location to which data is written to on a frequent basis may be referred to as a hot or warm storage device location. In some implementations, a storage device location to which data is written to on a less frequent basis may be referred to as a cold storage device location.

In some embodiments, before reading data from a particular storage location in storage device 140, control circuitry 130 may cross-reference log 142 to determine whether data associated with the particular storage location is available. In particular, when control circuitry 130 needs to read data from a given storage location, control circuitry 130 may first search each region in log 142 for an address that matches the given storage location. In response to identifying a matching address in a given region of log 142, control circuitry 130 may retrieve the corresponding data from the given region in log 142 instead of retrieving the data from the actual given storage location. If a matching address is not found in log 142, control circuitry 130 may access storage device 140 at the given storage location to retrieve the corresponding data.

In some embodiments, control circuitry 130 may execute an operation that requires data to be written to a particular address in storage device 140. In response, control circuitry 130 may search address field 210 (FIG. 2) of log 142 for addresses that match the particular address. If control circuitry 130 finds a matching address, control circuitry 130 may determine whether the data in data field 260 corresponding to the address is valid or not. Specifically, control circuitry 130 may determine whether valid information field 250 is set or not. When the valid information field 250 is set or equal to '1', control circuitry 130 may determine that the corresponding data is valid. In response, control circuitry 130 may set the value to '0' to invalidate the data corresponding to the matching address. Control circuitry 130 may also retrieve the write count stored in write count field 230 for the data that was invalidated. Control circuitry 130 may continue searching log 142 for other matching addresses. For each matching address that is found, control circuitry 130 invalidates the data if it is valid and retrieves the write count.

In some embodiments, after completing the search and invalidating the data stored for matching addresses, control circuitry 130 adds a new entry to log 142 for the particular address and data to be written to storage device 140. In some implementations, control circuitry 130 adds the new entry to log 142 based on the current position 270. Current position 270 may identify a region of log 142 to which data was last written to. In particular, current position 270 identifies which of the plurality of regions of log 142 control circuitry 130 wrote data to last time a write operation was performed. The fields of the new entry may include address field 210 with the particular address to be written and data field 260 with the data needed to be written to the particular address. The new entry may also include a write count field 230 that is set based on the values of the write counts retrieved from addresses that were found to match the particular address. In some implementations, the write count is set to the next consecutive value from the largest of the retrieved write counts. For example, if the write count values that were retrieved were 1, 2, and 3, then the write count stored in the new entry may be 4.

In some implementations, control circuitry 130 may check whether the region in log 142 corresponding to current position 270 has enough free space to accommodate the new entry. If the region has enough free space, control circuitry 130 may store the new entry to the region corresponding to current position 270. If the region does not have enough free space, control circuitry 130 advance current position 270 to the next adjacent region of log 142 and clear the entries stored in the next adjacent region of log 142 to make room to store the new entry. To clear the entries stored in the next adjacent region, control circuitry 130 may transfer data stored in each entry in the region corresponding to the new region identified by current position 270 (e.g., the region identified after control circuitry 130 advanced current position 270) to a data portion of storage device 140.

In some implementations, each region of log 142 may include multiple entries (e.g., four entries). In such circumstances, control circuitry 130 may transfer data stored in the multiple entries of the region corresponding to current position 270 to a data portion of storage device 140 based on the specified address fields 210 of each entry. For example, control circuitry 130 may transfer any data indicated by valid information field 250 to be valid to the actual address of storage device 140 specified by address field 210. Any data that is indicated to be invalid may be discarded by not being transferred. In such cases, the entry with the invalid data will be overwritten by a new entry. In particular, the address and data may be stored in log 142 at a different address or storage location of storage device 140 corresponding to log 142 than the actual address of storage device 140 in which the data needs to be stored. For example, while the data needs to be stored to the actual address of 7, the address and the data are stored in address 1 of storage device 140, which corresponds to a first region of log 142.

In some embodiments, to clear the entries stored in the region identified by current position 270, control circuitry 130 may selectively transfer only the valid data to the actual location on storage device 140 based on whether or not the data is associated with a hot, warm, or cold address. For example, control circuitry 130 may compare the write count value stored in field 230 for a given address in log 142 to a predetermined threshold. In response to determining that the write count value exceeds the predetermined threshold, control circuitry 130 may indicate the address to be a hot address. As a result, control circuitry 130 may transfer the entry including the address (e.g., the address stored in field 210 of the entry) and data (e.g., the data stored in data field 260 of the entry) to another region (e.g., an adjacent region to the region currently identified by current position 270) of log 142 instead of writing the entry's data to the corresponding address (specified in field 210) of storage device 140. In response to transferring the entry to the next adjacent region, control circuitry 130 may clear (or set to '0') the write count value for the entry that is to be transferred to the adjacent region. Also, control circuitry 130 may increment a chance count value stored in field 240.

In some embodiments, if the write count value does not exceed the predetermined threshold but the chance count value exceeds a different threshold (e.g., '1'), control circuitry 130 may transfer the corresponding entry to another region (e.g., an adjacent region to the region currently identified by current position 270) of log 142 instead of writing the data stored in the entry to the corresponding address of storage device 140. In some implementations, in response to determining that the write count value does not exceed the predetermined threshold, control circuitry 130 may indicate the address to be a cold address. As a result, control circuitry 130 may transfer data stored in each cold entry in the region corresponding of current position 270 to a data portion of storage device 140 as discussed above.

After clearing the entries stored in the new region identified by current position 270, control circuitry 130 may store the new entry created for the data to be written to log 142.

In some embodiments, current position 270 is advanced to the next adjacent region of log 142 in round robin manner. For example, current position 270 may identify the last region of log 142. In such circumstances, advancing current position 270 to the next adjacent region may cause current position 270 to identify the first region of log 142. For example, if log 142 has 4 regions (A, B, C, and D) and current position identifies C, then current position 270 is advanced to identify D, which is adjacent to region C. After being advanced once again, then current position 270 identifies A, since in round robin, A is the next adjacent region relative to region D.

Figure 3:
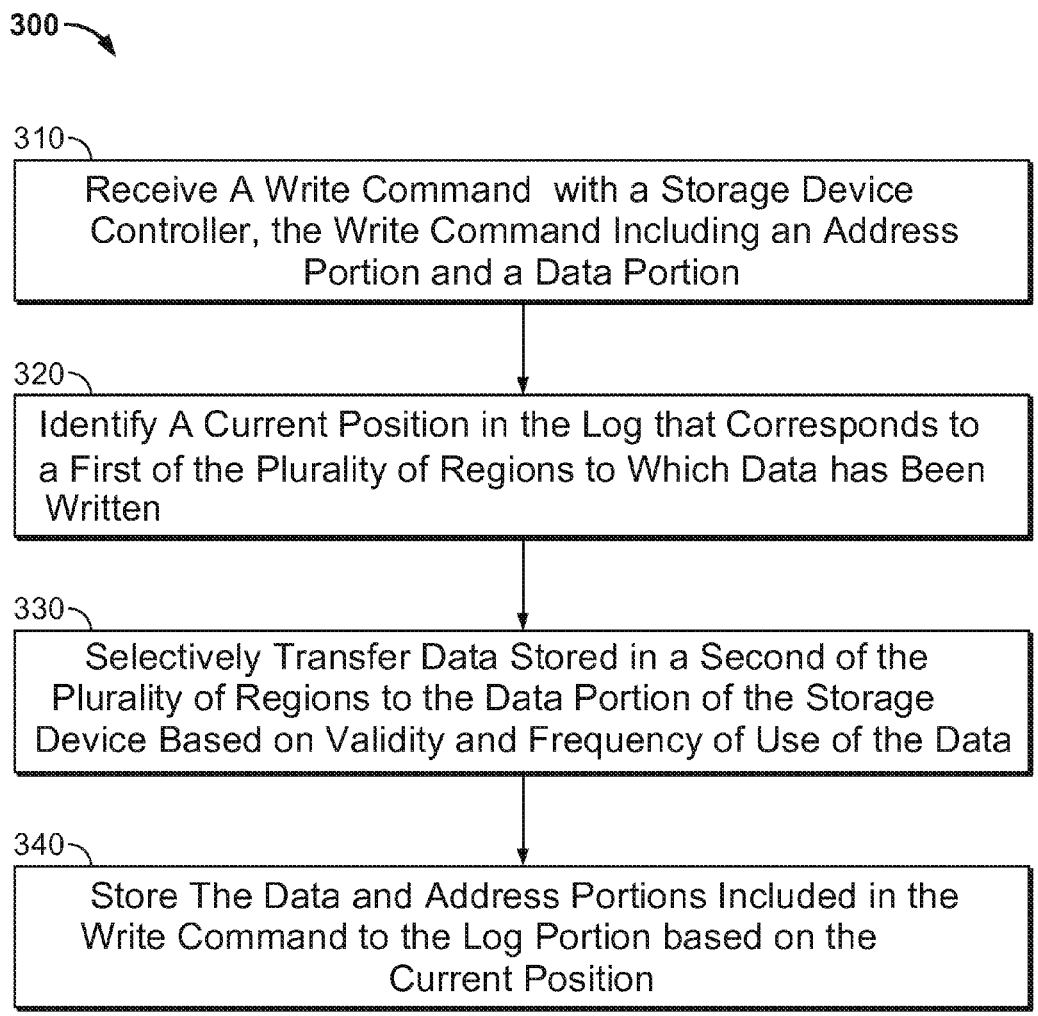
FIG. 3 illustrates a process for storing information in a storage device in accordance with an embodiment of the present disclosure.

FIG. 3 illustrates a process 300 for storing information in a storage device in accordance with an embodiment of the present disclosure. At 310, a write command is received with a storage device controller, the write command including an address portion and a data portion. For example, control circuitry 130 may receive instructions (e.g., a storage device command) from another system component such as processing circuitry 110 over bus 120 (FIG. 1).

At 320, a current position in the log that corresponds to a first of the plurality of regions to which data has been written last is identified. For example, control circuitry 130 may determine which region of log 142 was last written to (FIG. 2).

At 330, data stored in a second of the plurality of regions is selectively transferred to the data portion of the storage device based on validity and frequency of use of the data. For example, control circuitry 130 may determine whether the data stored in a second region is hot, warm or cold. If the data is hot or warm and not invalid, control circuitry 130 may transfer the data to a third region (e.g., a region adjacent to the second region) in log 142 instead of transferring the data to storage device 140. Alternatively, if the data is cold and not invalid, control circuitry 130 may transfer the data to storage device 140 instead of keeping the data in log 142. If the data is invalid, control circuitry 130 may overwrite the data in the region with a new entry.

At 340, the data and address portions included in the write command are stored to the log portion based on the current position. For example, control circuitry 130 may generate a new entry that includes the data and address in the write command and store the new entry to log 142 at a region corresponding to current position 270.

The foregoing describes methods and an apparatus for storing information in a programmable storage device. The above-described embodiments of the present disclosure are presented for the purposes of illustration and not of limitation. Furthermore, the present disclosure is not limited to a particular implementation. For example, one or more steps of methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software.

What is claimed is:

1. A method for operating on a storage device having a data portion and a log portion with a plurality of regions, the method comprising:
   receiving a write command with a storage device controller, the write command including an address portion and a data portion;
   identifying a current position in the log that corresponds to a first of the plurality of regions to which data has been written last;
   selectively transferring data stored in a second of the plurality of regions to the data portion of the storage device based on validity and frequency of use of the data; and
   storing the data and address portions included in the write command to the log portion based on the current position.

2. The method of claim 1, wherein storing the data and address to the log portion comprises:
   determining whether the first of the plurality of regions corresponding to the current position has enough free space for storing the data and address associated with the write operation; and
   in response to determining that the first of the plurality of regions does not have enough free space:
      advancing the current position to correspond to the second one of the plurality of regions adjacent to the first of the plurality of regions; and
      storing the data and address associated with the write command to the second of the plurality of regions.

3. The method of claim 2, wherein the data stored in the second of the plurality of regions is selectively transferred before the data and address associated with the write command are stored to the second of the plurality of regions.

4. The method of claim 1 further comprising determining whether the address included in the write command matches other addresses stored in the log portion before storing the data and address portions to the log.

5. The method of claim 1 further comprising invalidating data stored in the plurality of regions in the log associated with other addresses stored in the log portion that are determined to match the address included in the write command.

6. The method of claim 1 further comprising:
computing a write count associated with the write command based on a number of other addresses stored in the log portion that match the address of the write operation; and
storing the write count to the log portion based on the current position as the frequency of use of the data.

7. The method of claim 1, wherein selectively transferring data stored in a second of the plurality of regions comprises:
identifying data stored in the second of the plurality of regions that has not been invalidated;
comparing a write count associated with the identified data to a threshold; and
transferring the identified data from the log portion to the data portion of the storage device based on the address associated with the data in response to determining that the write count is less than the threshold.

8. The method of claim 7 further comprising:
transferring the identified data and associated address to a third of the plurality of regions and resetting the write count associated with the data in response to determining that the write count is greater than the threshold.

9. The method of claim 1 further comprising:
receiving a read command that includes an address portion;
determining whether the address portion of the read command matches any address stored in one of the plurality of regions in the log portion; and
retrieving the data stored in the one of the plurality of regions having the address that matches the address portion in the read command.

10. The method of claim 9, wherein retrieving the data comprises:
determining whether the data in the one of the plurality of regions having the address that matches the address portion in the read command is valid; and
in response to determining that the data is invalid, identifying another one of the plurality of regions in the log portion having an address that matches the address portion in the read command.

11. A system for operating on a storage device having a data portion and a log portion with a plurality of regions, the system comprising:
control circuitry configured to:
receive a write command with a storage device controller, the write command including an address portion and a data portion;
identify a current position in the log that corresponds to a first of the plurality of regions to which data has been written last;
selectively transfer data stored in a second of the plurality of regions to the data portion of the storage device based on validity and frequency of use of the data; and
store the data and address portions included in the write command to the log portion based on the current position.

12. The system of claim 11, wherein the control circuitry is further configured to:
determine whether the first of the plurality of regions corresponding to the current position has enough free space for storing the data and address associated with the write operation; and
in response to determining that the first of the plurality of regions does not have enough free space:
advance the current position to correspond to the second one of the plurality of regions adjacent to the first of the plurality of regions; and
store the data and address associated with the write command to the second of the plurality of regions.

13. The system of claim 12, wherein the data stored in the second of the plurality of regions is selectively transferred before the data and address associated with the write command are stored to the second of the plurality of regions.

14. The system of claim 11, wherein the control circuitry is further configured to determine whether the address included in the write command matches other addresses stored in the log portion before storing the data and address portions to the log.

15. The system of claim 11, wherein the control circuitry is further configured to invalidate data stored in the plurality of regions in the log associated with other addresses stored in the log portion that are determined to match the address included in the write command.

16. The system of claim 11, wherein the control circuitry is further configured to:
compute a write count associated with the write command based on a number of other addresses stored in the log portion that match the address of the write operation; and
store the write count to the log portion based on the current position as the frequency of use of the data.

17. The system of claim 11, wherein the control circuitry is further configured to:
identify data stored in the second of the plurality of regions that has not been invalidated;
compare a write count associated with the identified data to a threshold; and
transfer the identified data from the log portion to the data portion of the storage device based on the address associated with the data in response to determining that the write count is less than the threshold.

18. The system of claim 17, wherein the control circuitry is further configured to:
transfer the identified data and associated address to a third of the plurality of regions and resetting the write count associated with the data in response to determining that the write count is greater than the threshold.

19. The system of claim 11, wherein the control circuitry is further configured to:
receive a read command that includes an address portion;
determine whether the address portion of the read command matches any address stored in one of the plurality of regions in the log portion; and
retrieve the data stored in the one of the plurality of regions having the address that matches the address portion in the read command.

20. The system of claim 19, wherein the control circuitry is further configured to:
determine whether the data in the one of the plurality of regions having the address that matches the address portion in the read command is valid; and
in response to determining that the data is invalid, identify another one of the plurality of regions in the log portion having an address that matches the address portion in the read command.

* * * * *